Patented Apr. 8, 1924.

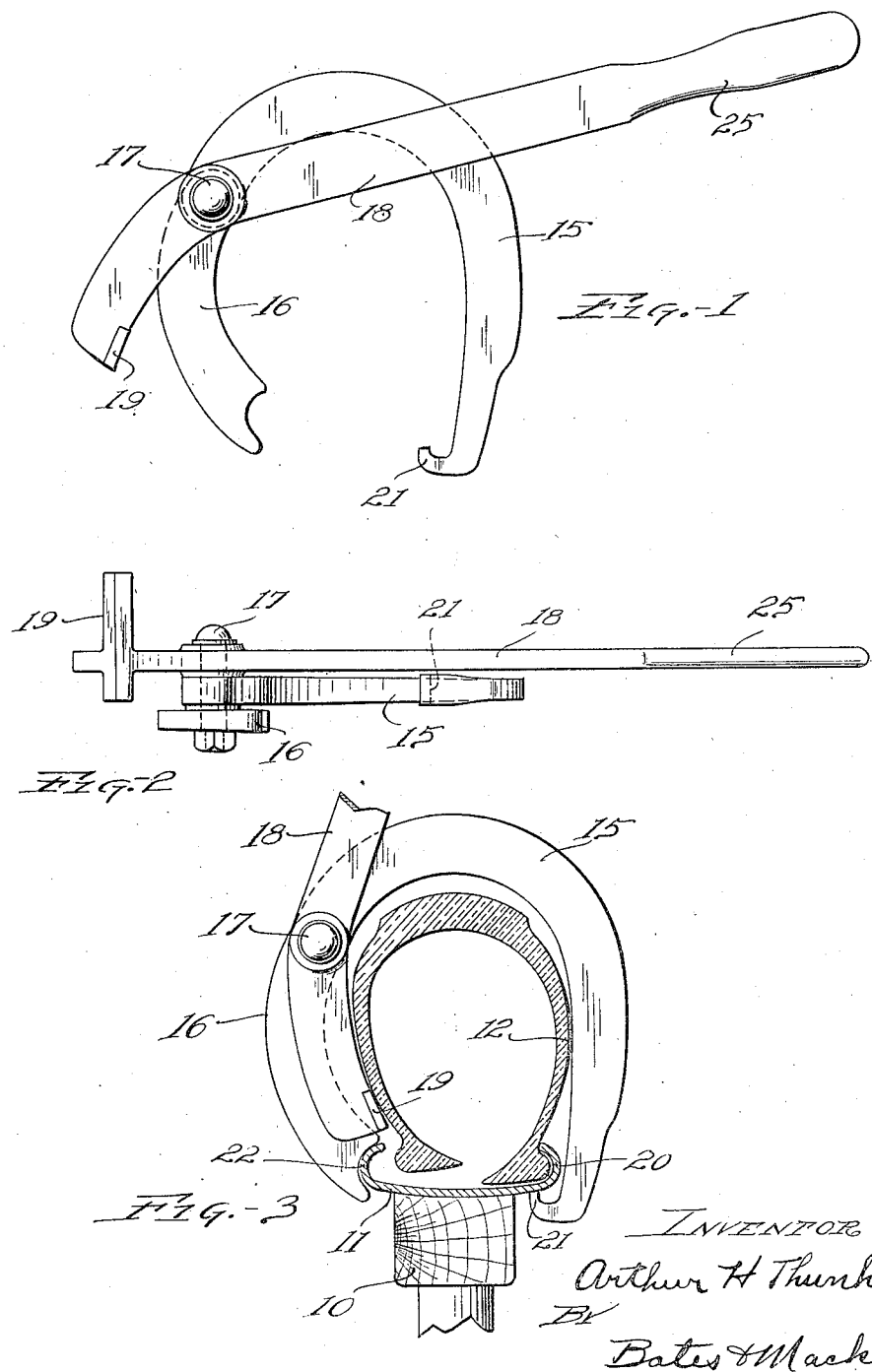

1,489,859

UNITED STATES PATENT OFFICE.

ARTHUR H. THUNHORST, OF CLEVELAND, OHIO.

TIRE-REMOVING TOOL.

Application filed August 12, 1921. Serial No. 491,670.

*To all whom it may concern:*

Be it known that I, ARTHUR H. THUN-HORST, a citizen of the United States, residing at Cleveland, in the county of Cuyahoga and State of Ohio, have invented a certain new and useful Improvement in Tire-Removing Tools, of which the following is a full, clear, and exact description, reference being had to the accompanying drawings.

This invention relates to automobile tire tools, and is especially concerned with the provision of a tool which is adapted for use in removing the tires from the rims.

The usual practice in removing a tire from its rim has been to employ a wedge-shaped tool, which is arranged to be driven between the rim and tire bead to loosen the tire. Frequently, rust from the rim causes the bead to adhere so closely thereto that it is difficult or impossible to insert such a wedge. I have found that this method requires considerable time and that several tools must be used to effect the desired result.

The objects of the present invention are the provision of a tool which shall be simple in construction, capable of being readily placed over a tire and brought into engagement with the rim, whereby one motion of the tire removing lever simultaneously engages the rim and removes the tire therefrom.

In accomplishing the above objects, I provide a pair of clamping jaws which straddle the tire and engage the flanges of the rim. The points of engagement serve as abutments to hold the jaws in position so that a displacement lever, pivoted to the jaws, may be operated to force one side of the tire inwardly and away from the rim. In this connection, my invention contemplates the provision of a tire removing tool which may be readily clamped to the rim without using fastening screws, or clamping nuts, to hold the tool during the displacement operation.

The means for accomplishing the above objects will be more fully set forth in the following description, which relates to the drawing, and the essential characteristics of my invention will be set forth in the claims.

In the drawings, Fig. 1 is a side elevation of a tire-removing tool embodying features of my invention; Fig. 2 is a plan view of the tool shown in Fig. 1; Fig. 3 is a section taken through a clincher tire affixed to a rim and wheel, and showing the use of a tire-removing tool constructed in accordance with my invention.

Designating the parts shown in the drawings by the use of reference characters, 10 represents the felly of a wheel having a rim 11 secured thereto and having a clincher tire 12 carried by the rim. My invention is shown in use with the clincher form of tire but it is applicable for the demountable type, or for any type wherein the tire is held by the flange of the rim. The only requisite for the operation of a tool constructed in accordance with my invention is, that the rim is provided with flanges against which the jaws, which will be hereinafter described, are adapted to be clamped.

To effect a quick acting tool which may be readily clamped upon the rim, I provide a pair of clamping jaws 15 and 16, each of which is curved to correspond with the contour of the tire, and pivoted at a common point, as at 17. The point of the pivotal connection, shown particularly in Fig. 3, is on one side of the center line of the tire so that when a force is applied to remove the tire, the various components resulting from the power applied may be used in clamping jaws to the rim.

To displace the tire, I have shown the displacement lever in the form of a bar 18 which is also pivoted at 17, and is provided with a tire engaging plate 19 adjacent the point where the bar engages the side of the tire. The end of the bar where the power is manually applied may be shaped to form a handle, as at 25. After the jaws are clamped to the rim the force exerted against the tire is, of course, dependent upon the force applied on the handle, and upon the relation between the length of lever on each side of the fulcrum 17.

Since the jaws 15 and 16 are each pivoted at 17 and shaped to conform to the cross-sectional contour of a tire, it is obvious that the jaws may be readily spread to straddle the tire, and to be quickly positioned on the rim. When in position for removing the tire, the jaw 15 is arranged to engage the flange 20 as by a lip 21, while the jaw 16 is arranged to engage the flange 22 on the upper and outer side thereof. The free end of the jaw 16 is preferably curved so as to be complementary to the flange 22.

As the displacement lever 18 is forced outwardly to press the contact plate 19 against the side of the tire, then the plate 19 and fulcrum 17 consitute a couple. The stresses resulting from the action of the couple are transmitted to the rim through the jaw 16 by a force acting downwardly on the flange 22, and through the jaw 15 by a thrust acting upwardly on the lower surface of the rim adjacent the flange 20. Consequently as power applied on the displacement lever is increased, the clamping jaws are caused to grip the rim to a greater degree. The jaw 15 may be so shaped that the side of the tire adjacent thereto may be brought into abutting engagement therewith during the tire removing operation. This facilitates the removal of the tire, inasmuch as it provides an abutment for holding one side of the tire, while the other side is being collapsed.

The operation of my invention is as follows:

The jaws 15 and 16 are spread apart and positioned across a tire until the arcuate end of the jaw 16 engages the flange 22, and the lip 21 on the jaw 15 engages beneath the flange 20. Then the handle 25 is pulled outwardly until the contact plate 19 engages the side of the tire adjacent the jaw 16, whereupon as the handle is pulled still further outwardly, the jaws are caused to grip the rim more securely and the tire is collapsed. A tool, such as a chisel, is then inserted between the tire and rim, and the tire-displacing tool is then removed to another point on the circumference of the tire, whereupon the operation is repeated.

From the foregoing description, it will be seen that I have provided a tire-removing tool which is quite simple in construction, and which may be handled as a unit for removing either a clincher, or a demountable type of tire. An advantage of a tool constructed in accordance with my invention is, that a simple article is produced which is cheaply manufactured, and which may be readily carried, as a unit, in the automobile tool box.

Having thus described my invention what I claim is:—

1. A tire removing tool having in combination, a pair of members pivoted at one end to each other and shaped to straddle a tire, the free end of one of said members having a recessed portion to engage one flange of a rim, the free end of the other member having a laterally and upwardly extending portion to engage the other flange of the rim, and tire displacing lever pivotally connected to one of said members.

2. A tire removing tool having three members pivotally connected at a common point, one member having a recessed portion to engage the top of a rim on one side thereof, the free end of another member having a portion to engage beneath the rim on the opposite side thereof, and the third member having a laterally extending portion to engage the side of a tire, said last mentioned member comprising a hand lever.

3. A tire displacing tool having in combination, three members which are pivotally connected at a common point, one of said members having the end thereof recessed to engage one flange of a rim and another member having laterally extending portions to engage beneath the opposite flange of a rim, the third member comprising a tire displacing lever, one end of which has a laterally extending portion for engaging the side of a tire, and the other end of which is provided with a handle, said pivotal connection lying on one side of a plane passing through the center of the tire, whereby movement of the lever in one direction simultaneously effects engagement between two of the members and a rim and displaces the tire from the rim.

In testimony whereof, I hereunto affix my signature.

ARTHUR H. THUNHORST.